United States Patent [19]
Mueller et al.

[11] Patent Number: 5,932,051
[45] Date of Patent: Aug. 3, 1999

[54] PRE-STRESSED BONDING SYSTEM FOR DOUBLE SIDED COMPACT DISCS

[75] Inventors: William Mueller, Clarks Summit; Edward Pickutoski, Olyphant; Lewis Robert Gensel, Jr., Avoca, all of Pa.

[73] Assignee: WEA Manufacturing, Inc., Olyphant, Pa.

[21] Appl. No.: 08/708,737

[22] Filed: Sep. 5, 1996

Related U.S. Application Data

[60] Provisional application No. 60/003,201, Sep. 5, 1995.

[51] Int. Cl.$^6$ ........................................ B32B 31/00
[52] U.S. Cl. ........................... 156/228; 156/580; 156/581
[58] Field of Search .................................. 156/288, 228, 156/160, 553, 556, 580, 581

[56] References Cited

U.S. PATENT DOCUMENTS

| | | | |
|---|---|---|---|
| 4,811,324 | 3/1989 | Ikedo et al. | 369/75.2 |
| 4,903,140 | 2/1990 | Okamoto et al. | 358/342 |
| 4,939,011 | 7/1990 | Takahashi et al. | 428/64 |
| 5,097,475 | 3/1992 | Funabashi et al. | 369/199 |
| 5,284,538 | 2/1994 | Suzuki et al. | 156/154 |
| 5,324,473 | 6/1994 | Baresich | 264/327 |
| 5,378,517 | 1/1995 | Suzuki et al. | 428/64 |
| 5,480,596 | 1/1996 | Okubo et al. | 264/1.33 |
| 5,689,497 | 11/1997 | Wilting et al. | 369/275.1 |
| 5,792,538 | 8/1998 | Yurescko-Suhan | 428/64.1 |

*Primary Examiner*—James Sells
*Attorney, Agent, or Firm*—Gottlieb, Rackman & Reisman, P.C.

[57] ABSTRACT

An in-line system for fabricating a double sided compact discs by bonding together an information bearing surface and another surface, has a prestressing station with means for deforming at least one of the surfaces in such away as to not disturb any of the data. It employs an adjustable spacer for maintaining an adjustable separation between symmetrical arcuate portions of the outer circumference of the information bearing surfaces in the bonding station. This adjustable spacer comprises two spacer arms that comprise wedge shaped portions for entry between the edges of said discs and maintaining a displacement of at least the outermost edges of said discs. There is also disc displacement means for bringing together the two information bearing surfaces by displacement of at least one of said information bearing surfaces orthogonal to the plane of the surfaces.

6 Claims, 6 Drawing Sheets

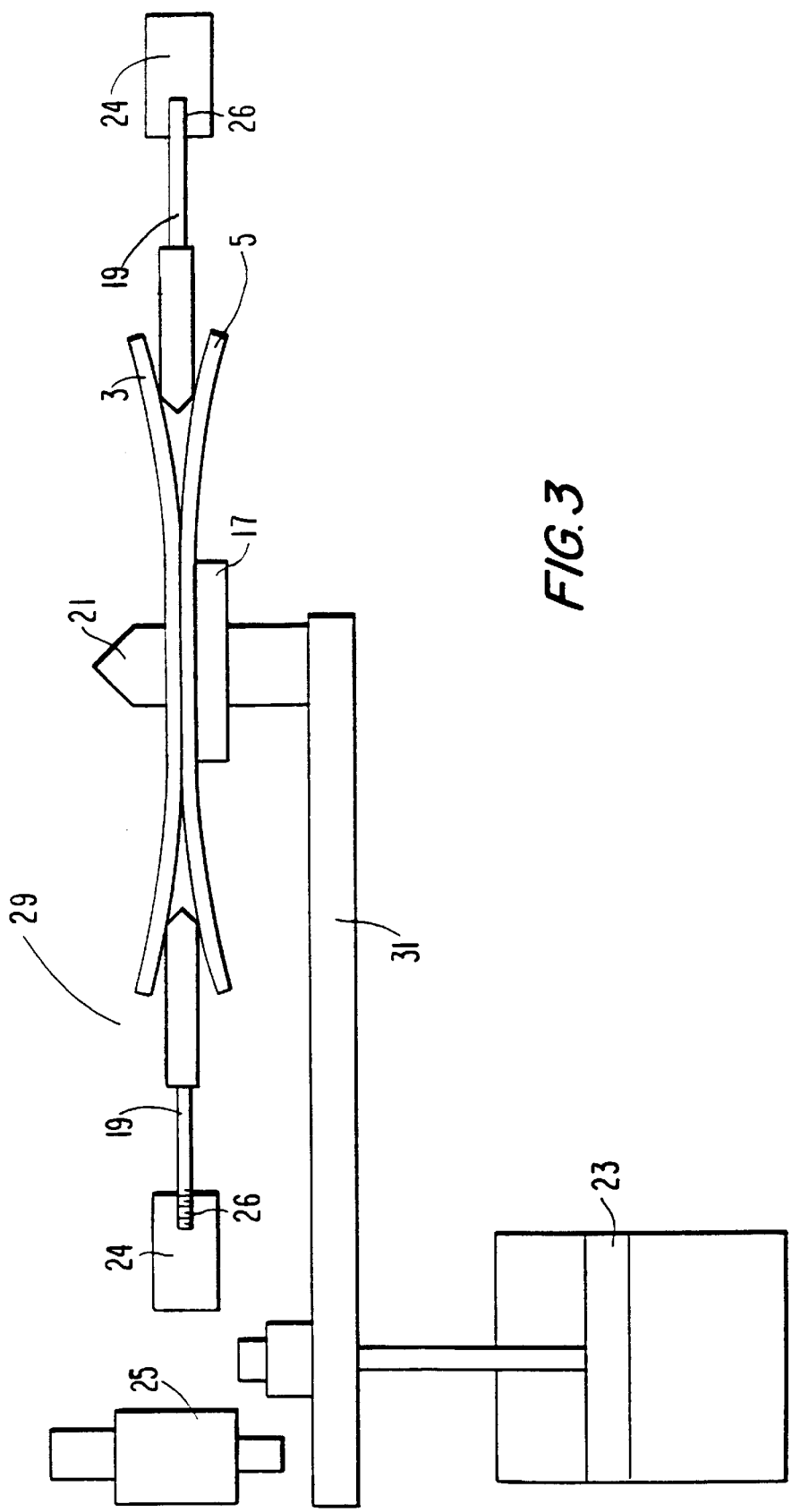

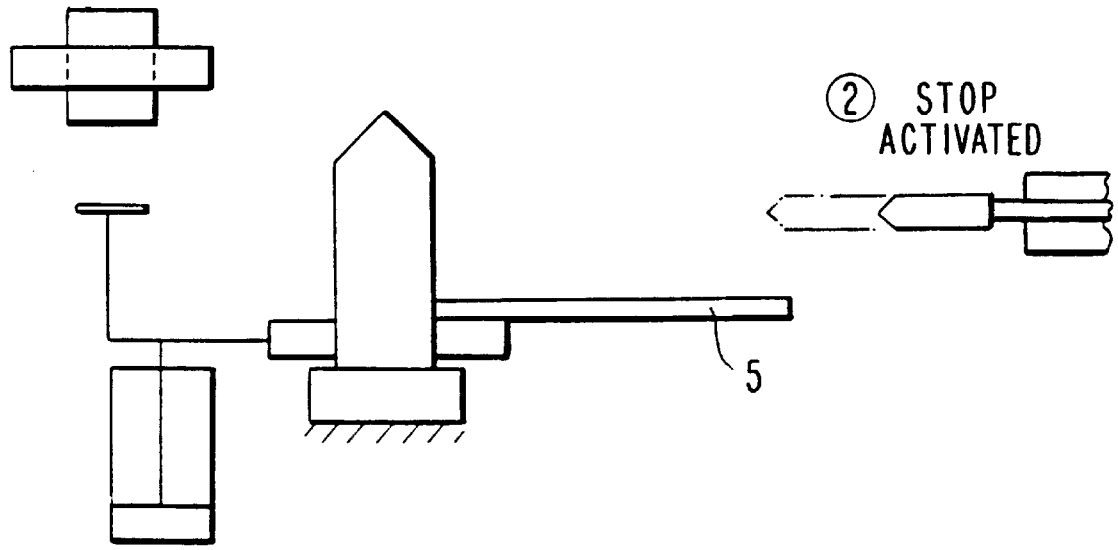
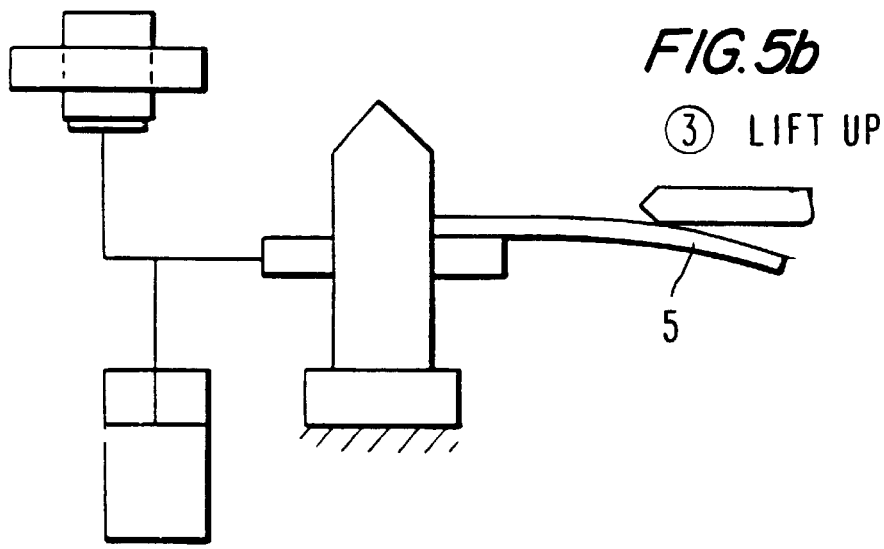

④ ROBOT PLACES "B" DISC

⑤ STOPS REMOVED

⑥ DISC 5 REMOVED

LIFT DOWN

PRE-STRESSED BONDING SYSTEM FOR DOUBLE SIDED COMPACT DISCS

This application claims the benefit of U.S. Provisional Application No. 60/003,201, filed Sep. 5, 1995.

FIELD OF INVENTION

The present invention relates to double sided compact disc systems having a pit optical track structure. In particular the invention relates to a method and apparatus for bonding together two thin compact discs to form a flat double sided disc in an assembly line manufacturing system. It also relates to bonding a thin compact disc to a thin plastic disc in order to provide greater strength to the composite.

BACKGROUND OF THE INVENTION

Plastic discs having a pit optical track structure are well known as compact discs. Double sided discs in which information is recorded on two sides of such a structure formed by binding two compact discs and apparatus for playing such discs is also well known, as in U.S. Pat. Nos. 4,903,140; 4,939,011; 5,097,465; 4,811,324. In forming such discs it is also known from U.S. Pat. Nos. 5,284,538 and 5,378,517 that it is advantageous to bring the two disc portions together at an angle in order to facilitate bonding.

The term compact disc as used in this application includes any disc shaped recorded medium having pits and lands forming an optical track structure on a data information recording planar surface. Thus it includes such discs where the information stored as pits and lands is digital information, analog information, or information of a graphic or holographic nature. Examples of the different types of information storage are as follows: Digital information may be encoded into the pits and lands as pits of quantized lengths interpretable as a stream of digital data, wherein the length of each pit or land segment may be, for example, related to the number of 1's or 0's in a data stream. An example of such a system is the compact disc ("CD") audio or video disc. Analog information may be encoded into the pits and lands as pit lengths that may vary over a continuum of values, wherein the length of each pit or land segment may be, for example, related to a voltage level in a desired output. An example of such a system is the laser disc video recording system. Graphics may be placed on the surface of a disc by employing the light reflection properties of pitted surfaces that are visible to the unaided eye. Similarly holographic information may be stored in a pit/land format, particularly where it is possible to vary the pit depth to create reflection interference patterns that are visible as a holographic image viewable by the unaided eye.

In-line manufacturing systems are utilized for mass producing copies of compact discs. These systems are capable of producing a compact disc every few seconds once a master disc has been produced. The process employs injection molding, vacuum metalizing, electroplating printing and if required, protective lacquer coating stages and robotic mechanisms for moving the discs from station to station.

An important requirement in the formation of certain double sided discs is the need to bond together two extremely thin discs to form the composite. Thin discs enable the encoding of data using reduced pit dimensions. Where a thin disc is produced it is necessary to provide additional thickness by bonding a plastic surface to the compact disc even where the plastic surface is not a compact disc in the sense that it does not separately encode data.

The composite must remain its planarity in order to be readable, and the bonding material must be applied uniformly and completely across the surfaces to be bonded. In the context of an in-line process it must be expected that the two surfaces may arrive at the bonding station at different temperatures, reflecting different lengths of time since heat generating processed. It is therefore necessary to compensate for these temperature differences so that a deformation of the bonded structure does not occur as the double sided disc achieves a uniform temperature and thereby to avoid a potato chip shape for the resulting composite disc. For purposes of this disclosure, a composite formed by bonding that has either one or two information bearing surfaces will be referred to as a double sided compact disc.

BRIEF DESCRIPTION OF THE INVENTION

The present invention is an in-line system for fabricating a double sided compact disc by bonding together an information bearing surface, referred to as compact disc, to a second surface that may or not be information bearing and resulting in a flat composite capable of being read at high data density. The composite is called a double sided compact disc.

The in-line system comprises a prestressing station, a bonding station (where adhesive is applied) and optionally an off-loading carousel station. The bonding station and the prestressing station may be combined into one station. The main element for the purposes of this invention is the prestressing station, whose action is designed to prevent the double sided compact disc from assuming a non-planar potato-chip shape, i.e. a saddle or hyperboloid shape, as the result of differential cooling of the two joined surfaces. The prestressing station comprises a bonding pre-press means for deforming at least one of the surfaces depending upon the temperature difference between the surfaces. The pre-press means comprises an adjustable spacer for maintaining an adjustable displacement wedge or separation between symmetrical arcuate portions of the outer circumference of surfaces of the composite and a moveable chuck for causing the surfaces to bear against the spacer. This adjustable spacer comprises two opposing spacer arms that comprise wedge shaped portions for entry between the edges of the surfaces and for maintaining a separation of at least the outermost edges of said surfaces. The moveable chuck, together with an associated platform forms a disc displacement means for moving the centers of the two information bearing surfaces orthogonal to the plane of the surfaces, and a stop means for limiting the minimum displacement of said disc displacement means. The off loading carousel station receives the completed double sided discs.

BRIEF DESCRIPTION OF THE DRAWINGS

FIG. 3 depicts the bonding pre-press station of the present invention.

FIGS. 5a–5f show a sequence of steps during the bonding operation.

DETAILED DESCRIPTION OF A PREFERRED EMBODIMENT OF THE INVENTION

Figure 1:
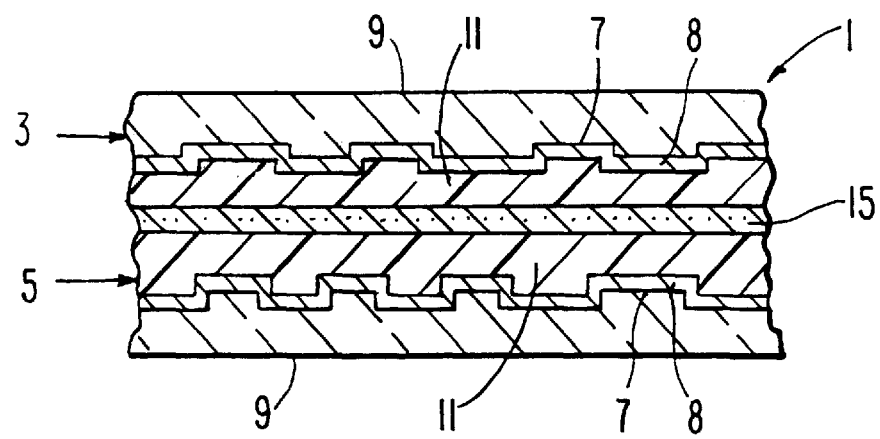
FIG. 1 depicts a cross section of a double sided compact disc produced by the present invention.

A preferred embodiment of the present invention may be best described in connection with the figures. FIG. 1 depicts a cross section of a portion of double sided compact disc 1 formed from first and second information bearing surfaces 3 and 5. Each information bearing surface is formed by depositing upon a pattern of pits and lands 7 a metallic reflective coating 8. The pattern of pits and lands, which encodes the data on the information bearing surface, is first formed by injecting molten transparent polycarbonate plastic into a mold cavity, with a stamper on one face to produce a clear plastic disc with pits impressed on one side. Great care is taken to insure that the resulting opposing clear plastic surface 9 is planar. The opposite side of the half disc need not be transparent and is filled with a material 11 to protect the metallic surface 13 deposited on the pits and lands 7. It is this material that is printed upon in single sided CD's. A bonding material 15 adheres the information bearing surfaces together. It is also within the scope of this invention to use a bonding material which also seals the metallic surfaces at the same time. Another alternative is to form the double sided CD without the need for an additional bonding material 15 by causing the two surfaces 11 to bond together. The composite of the present invention is preferably fabricated from surfaces having a thickness of 0.6 mm resulting in a composite having a thickness of about 1.2 mm.

The 0.6 mm compact disc offers several advantages over the 1.2 mm format, particularly in the field of high data density optical discs in which data is recorded in a spiral track of alternating pits and lands. Laser light returned to a reading head by such pits and lands is viewed through an optically flat side of the compact disc. Some bending of the light received from a pit or land occurs at the surface of the polycabonate surface of the compact disc. A thinner compact disc enables the reading laser to employ a smaller spot size and the lenses of the reading head to have a higher numerical aperture when used to readout a pattern of pits and lands. The readout the data from such thinner compact discs uses laser light with a smaller wavelength than was used for the 1.2 mm discs. This has entailed a wavelength change from 780 nm to approximately 650 nm or less. Thus, the readout of a higher density of pits and lands, and therefore of more data per disc, is possible with the thinner optical discs. The typical improvement is from 650 mega-bits of data to 5 giga-bits.

Figure 2:
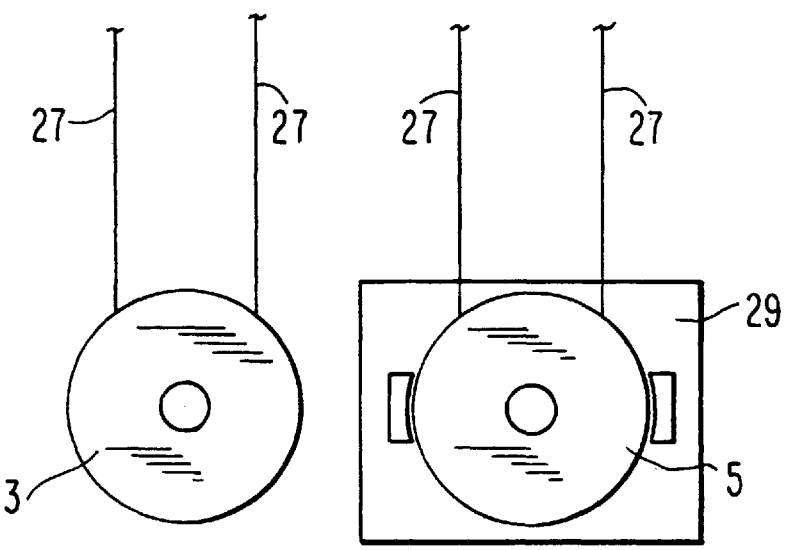
FIG. 2 depicts the in-line system of the present invention for producing double sided compact discs.

FIG. 2 depicts a portion of the in-line manufacturing system for double sided compact discs. The two discs 3 and 5 that form a pair to be bonded travel together upon disc transport belts 27. One disc 5 from the pair is brought into a prestressing station 29.

FIG. 3 shows in greater detail the construction of the prestressing station. It comprises a platform 17 and paired displacement wedges 19 alternately displaced around a chuck spindle 21 which engages the central hole in a compact discs 3 and 5. Disc 3 need not be an information bearing disc. The spindle 21 and the platform 17 may be raised and lowered with respect to the displacement wedges 19 by the lifting arm 31 that is in turn supported on the vertical lifting device 23. The upper extent of motion of the lifting arm is limited by a micrometer stop 25.

Figure 4A:
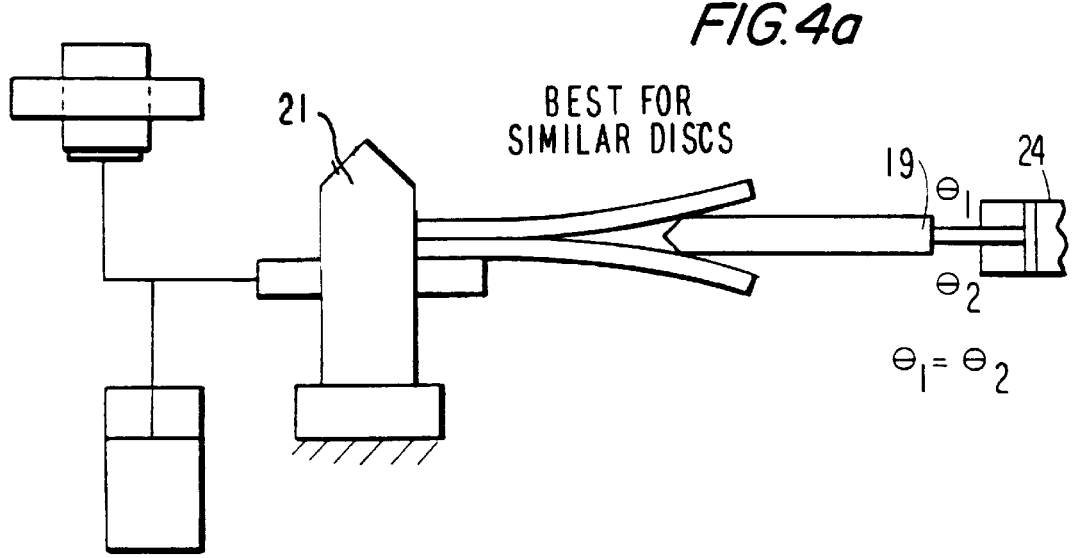
FIGS. 4a–4c depict a pre-press station during the deformation of on surface of a double sided compact disc.
Figure 4B:
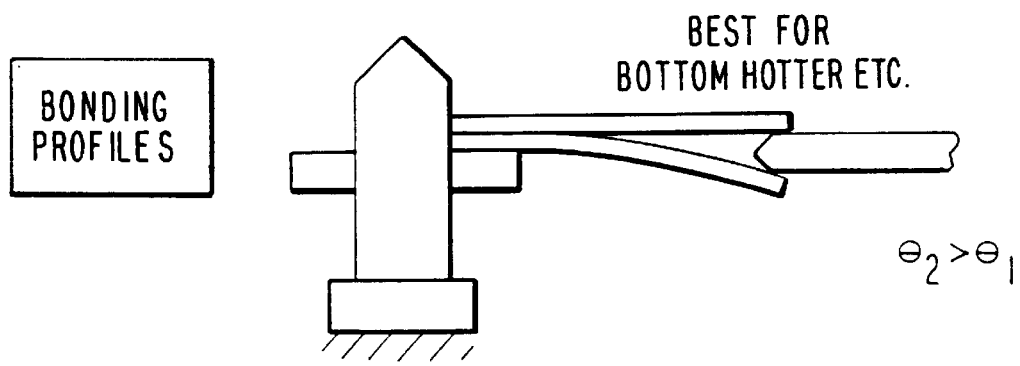
Figure 4C:
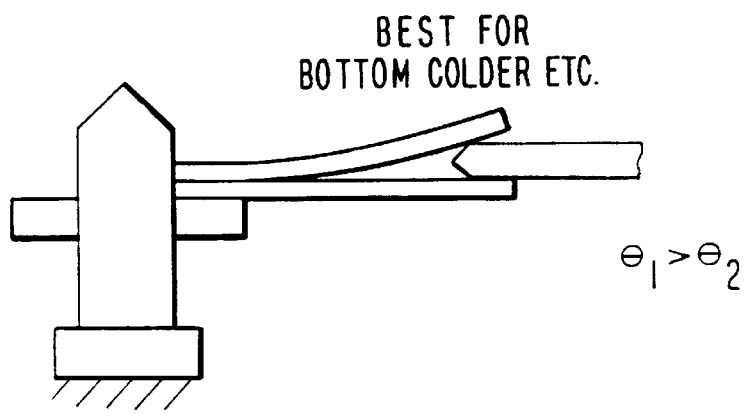

FIGS. 4a–4c show a portion of the prestressing station with the central spindle 21 in different positions with respect to the displacement wedges 19 thereby causing the edges of the compact disc 5 in contact with the wedges 19 to be lifted to different degrees relative to the central hole of the disc. At such a time, at least one of the compact discs 5 is no longer planar, but has assumed a form which is a portion of the surface of a cylinder whose axis, if depicted in FIG. 4 would be coming out of the plane of the paper and would be above the disc surface. FIG. 4a shows a configuration that is preferred if the two discs are similar both in construction and in temperature. FIG. 4b shows a preferred configuration when the bottom disc is warmer. FIG. 4c shows a preferred configuration when the bottom disc is colder. In each configuration it is assumed that a bonding material has already been placed on the facing surfaces of the discs.

It is critical that the deformation of the compact disc 5 which is termed pre-stressing, in fact not change the distance along any of the data paths on the surface of the compact disc since those distances encode the information on the disc or that if any deformation is caused that it be undone when the disc is returned to a planar form during bonding. Thus what is preferred is a deformation that introduces curvature into the disc surface without stretching. The present invention makes use of the fact that the surface of the compact disc can be deformed without altering the content of the data stored therein.

Deformations of a planar surface without stretching are possible. In particular, the deformation of a plane does not result in stretching when at each point of the deformed surface a straight line lies in the surface. This condition is satisfied if the deformation results in a cylindrical deformation. It would not be satisfied, for example, if the disc were deformed upwards all around its lip into a spherical cap. Thus, the selection of opposing wedges, which results in a cylindrical deformation of the surface is preferred. This will result in no change in the distance measured along the disc between any two points on the disc and therefore will not change any of the information encoded onto the disc.

The retractable displacement wedges 19 may have their position relative to the axis of the chuck 21 controlled by spacer advancers 24. This position may be controlled by advancing threads 26 tapped into the displacement wedge advancer.

Figure 5C:
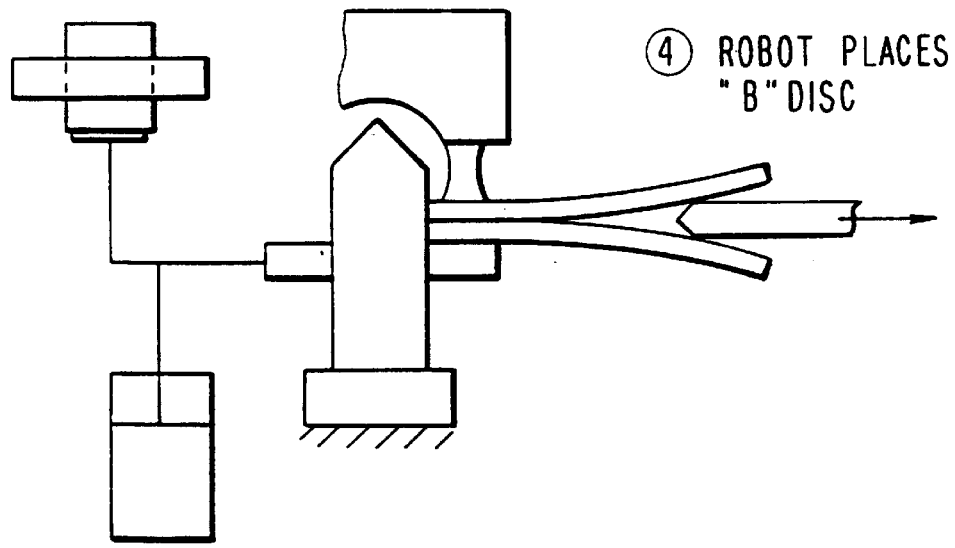
Figure 5D:
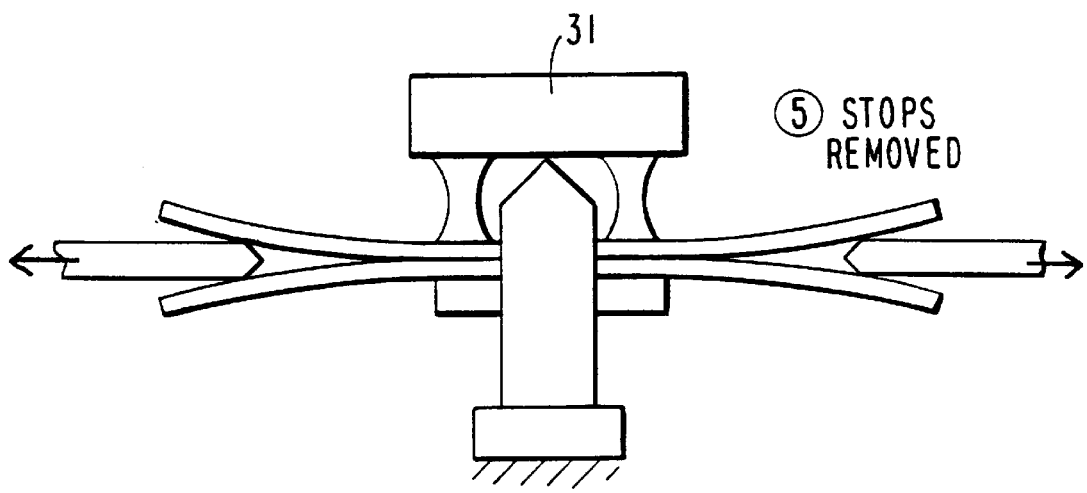
Figure 5E:
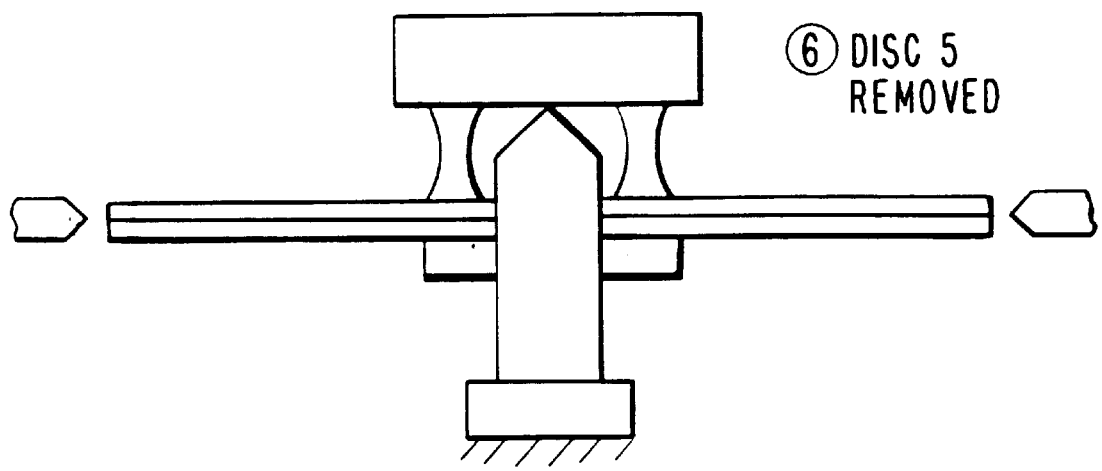
Figure 5F:
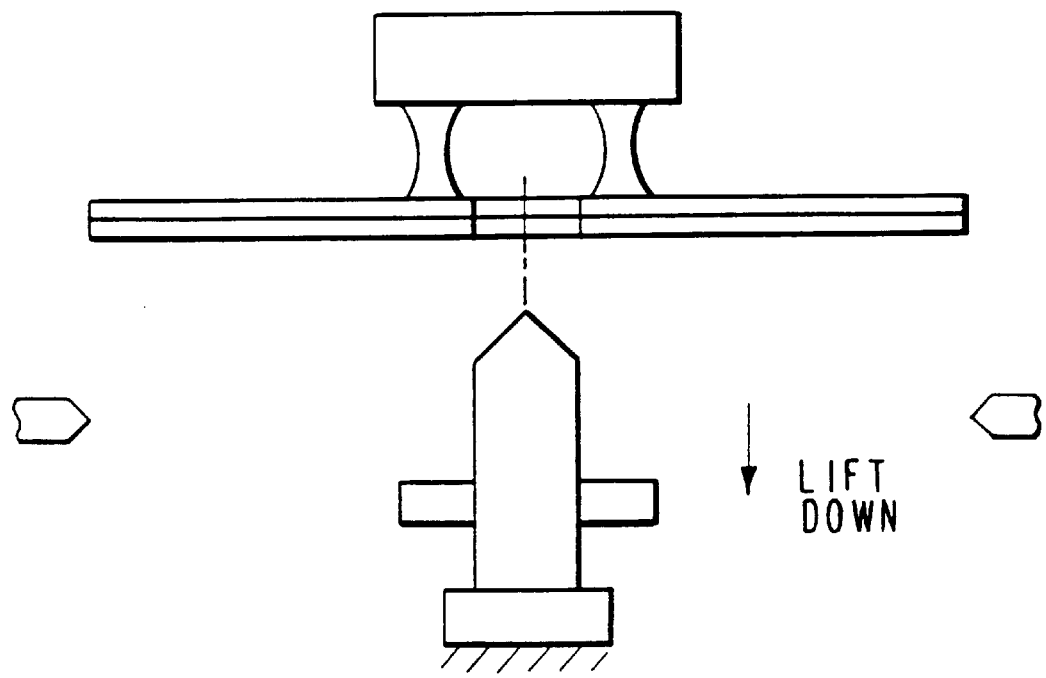

FIGS. 5a–5f show a sequence of steps during the bonding operation. As shown in FIG. 5a one disc (for simplicity only half of the disc is shown in the figure) is place on the central spindle and the displacement wedge 19 is brought to a correct position with respect to spindle 21. The platform 17 is then brought to a correct position with respect to displacement wedge 19 by raising the platform to an appropriate height. The figure shows the correct positioning for a situation such as is depicted in FIG. 4a where it is desired to have an equal deformation of both discs. A robotic mechanism 31 then places the upper disc in place on the spindle as shown in FIG. 5c and bears down to deform the upper disc (if necessary) against the displacement wedge. The stops are then removed (as in FIG. 5d) resulting in complete adhesion of the two discs as desired with lessened non-planar deformation. The discs are then removed. The robotic mechanism 31 then removes the discs and carries them to a spindle where they are stacked and moved to the next operation station if desired.

The cylindrical curvature of the discs 5 aids in the flow of the bonding material as the disc surfaces are pressed together by their natural elasticity and the removal of the wedges. In this regard it is found that an angle of about 5° between the discs is optimum. The 5° is the arc tangent of the spacer thickness divided by the radius of the disc.

Aside from the aid to the flow of the bonding material, the curvature of one of the discs has a further benefit. Since the discs may initially have different temperatures, it is necessary to accommodate some sliding of one surface over the other during the bonding process as the two discs reach the same temperature. This sliding is due to the expansion of one disc relative to the other. The curvature of the disc facilitates such sliding since the full surface area of contact starts from an initial value and gradually increases as the surfaces are brought together. Thus the sliding forces are relatively small and more easily accommodated by the discs.

To further accommodate the bonding of surfaces of different temperatures it is preferred that the spacer advancer 23 be automatically adjustable for temperature differences. The greater the temperature difference between the disc surfaces the greater the angle between the surfaces to be joined. This is a particularly useful feature in in-line systems where one group of discs may have been made long before and cooled while the second group is coming more recently from the injection process.

While there have been shown and described and pointed out the fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. The method of bonding a compact disc surface to another surface to form a planar composite comprising placing one disc surface on a central spindle extending from a platform, moving at least a pair of spacers to a predetermined position with respect to the spindle, raising the platform supporting said one disc to a predetermined height, wherein the said one disc contacts said pair of displacement wedges and causes deformation of the said one disc by a predetermined amount which may be none, placing an upper disc on the spindle and bearing down to deform the upper disc against the displacement wedge spacer by a predetermined amount, moving said spacers away from said spindle, wherein adhesion of the two surfaces takes place.

2. An in-line system for fabricating a double sided compact disc comprising bonded together a first information bearing surface and a second surface, said in-line system comprising disc transport means for bringing to a prestressing station said two surfaces to be bonded together, said prestressing station comprising disc support means comprising a central spindle and a platform for retaining a disc by its central opening, said disc support means moveable in a vertical direction by a vertical lifting means, displacement wedge means comprising at least a pair of arms capable of motion toward and away from said central spindle and of contacting said disc, robotic means for placing said surfaces on said central spindle, for pressing said surfaces downwardly and for lifting said surfaces upwardly, whereby both surfaces contact said displace wedge means and at least one of said surfaces is bent from a plane thereby.

3. An in-line system for fabricating a double sided compact disc comprising bonded together a first information bearing surface and a second surface, said in-line system comprising pre-press means for deforming at least one of said surfaces comprising adjustable displacement wedge means for maintaining an adjustable separation between symmetrical arcuate portions of the outer circumference of the first information bearing surface and the second surface, said adjustable displacement wedge means comprising symmetrically placed retractable displacement wedge arms, said displacement wedge arms comprising end portions for entry between the edges of said discs and maintaining a displacement between at least the outer circumference of said discs, disc displacement means for contacting at least one of said surfaces by displacement of said surface orthogonal to the plane of said surfaces.

4. The in-line system for fabricating a double sided compact disc of claim 3 further comprising stop means for limiting the displacement of said displacement wedge means.

5. The in-line system for fabricating a double sided compact disc of claim 3 further comprising robotic means to place second surface upon the first and pressing their central regions together, the circumferences of said surfaces touching on opposite sides of said displacement wedge means thereby deforming at least one said surfaces from a plane.

6. The in-line system for fabricating a double sided compact disc of claim 3 further comprising an off loading station for receiving said completed double sided discs.

* * * * *